United States Patent [19]

Bonnaterre

[11] 4,166,886
[45] Sep. 4, 1979

[54] NICKEL-CADMIUM CELL AND METHOD FOR PRECHARGING NEGATIVE ELECTRODE OF NICKEL-CADMIUM ALKALINE STORAGE CELL

[75] Inventor: Raymond Bonnaterre, Bordeaux, France

[73] Assignee: Saft-Societe des Accumulateurs Fixes et de Traction, Romainville, France

[21] Appl. No.: 925,560

[22] Filed: Jul. 17, 1978

[30] Foreign Application Priority Data

Dec. 5, 1977 [FR] France ................................ 77 36500

[51] Int. Cl.$^2$ .......................................... H01M 10/34
[52] U.S. Cl. ...................................... 429/60; 429/222; 204/2.1
[58] Field of Search ................... 429/222, 223, 57, 59, 429/60; 204/2.1, 77, 78, 129

[56] References Cited

U.S. PATENT DOCUMENTS

| 2,899,480 | 8/1959 | Fleischer | 204/2.1 |
| 3,713,889 | 1/1973 | Lecouffe | 204/2.1 |
| 3,986,893 | 10/1976 | Stephenson | 204/2.1 |

Primary Examiner—Charles F. LeFevour
Attorney, Agent, or Firm—Kenyon & Kenyon

[57] ABSTRACT

A method for precharging the negative electrode of a nickel-cadmium alkaline storage cell whose electrodes are assembled in an at least partially discharged state, wherein before the first charge of the cell, a calculated quantity of a material is introduced in the cell, such material being irreversibly oxidizable in an alkaline medium at a potential such that it is anodically oxidized before nickel hydroxide without evolving any gas, then the cell is charged in the normal way. The material preferably is an organic material of the general formula $C_xH_yO_z$; most preferably where $x=n$, $y=2n+2$, and $z=1$, with n less than 4. This particular class of materials comprises the three saturated mono-alcohols: methanol, ethanol and propanol.

10 Claims, No Drawings

NICKEL-CADMIUM CELL AND METHOD FOR PRECHARGING NEGATIVE ELECTRODE OF NICKEL-CADMIUM ALKALINE STORAGE CELL

BACKGROUND OF THE INVENTION

This invention relates to a method for precharging the negative electrodes of nickel-cadmium alkaline storage cells, and is particularly useful in sealed, semi-sealed or semi-open cells.

Precharging the negative electrode of a cell consists in establishing a state of charge such that the charged capacity of the negative electrode is greater than the charged capacity of the positive electrode. To avoid the evolution of hydrogen in sealed cells it is known to provide the negative electrode with a capacity greater than that of the positive electrode, so that when the positive electrode reaches its completely charged state there still remains some non-charged capacity on the negative electrode. If the negative electrode is charged by an amount which is less than the difference between the negative and positive capacities before the positive electrode is charged, some uncharged capacity will remain on the negative electrode at the end of charging the positive electrode. Furthermore, after the positive electrode is discharged, the negative electrode will still be partly charged. As a result, the end of discharge is clearer, and the capacity of cells with precharged negative electrodes is more stable during cycling.

It would appear fairly simple to impart these states of charge by charging the cell while in the open state with the required capacity, but in cells with thin electrodes which are close together, it is known that when the positive electrode reaches the end of charging, the charge efficiency of the negative electrode becomes very low or even zero. The quantity effectively charged on the negative electrode therefore does not correspond to the quantity of electricity supplied.

On the other hand, if it is sought to impart the required charge to the negative electrode before assembling the cell, it is found that the charge does not remain stable during handling of the electrode, due to the reactivity of reduced cadmium.

It is known through U.S. Pat. No. 3,713,889 to fix the relative states of charge of the electrodes of an alkaline storage cell in which the negative electrode has a capacity greater than that of the positive electrode by charging the cell in the open state and by imparting a sufficient overcharge to it, after complete charging of the positive electrode, for the negative electrode to be in a state of charge such that its charged capacity is greater than that of the positive electrode. Since this excess charged capacity must be fixed accurately, the previously-mentioned overcharge is carried out at a temperature of about $-10°$ C. Preferably, the excess charged capacity of the negative electrode lies between 10 and 50% of the difference between the real overall capacity of the negative electrode and the capacity of the positive electrode. Such a method is difficult, however, since it is necessary to operate at low temperature.

Further, in some cases where the required precharge is to be made on the positive electrode, it has been proposed to introduce a chemical oxidizing agent which transforms nickel hydroxide into higher hydroxides. However, transposition of this method to precharging the negative electrode by means of cadmium hydroxide reducers is not possible, since cadmium hydroxide is chemically much too stable.

SUMMARY OF THE INVENTION

The present invention makes it possible to remedy these drawbacks. It provides a method for precharging the negative electrode of a nickel-cadmium alkaline storage cell whose electrodes are assembled in an at least partially discharged state, wherein before the first charge of the cell a calculated quantity of a material is introduced in the cell, said material being irreversibly oxidizable in an alkaline medium at a potential such that the material is anodically oxidized before nickel hydroxide without evolving any gas, then the storage cell is charged in the normal way.

Any material based on carbon, hydrogen, and oxygen atoms can be used, provided that it can be irreversibly anodically oxidized without evolving any gas; for example, by producing water and carbonate ions, as in the following reaction

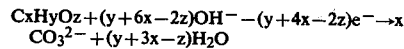
$$CO_3^{2-} + (y+3x-z)H_2O$$

Because it is desirable to keep the formation of carbonate ions to a low value, it is advantageous to choose materials in which x is as low as possible, inasmuch as the carbonate ions produced are in proportion to x. At the same time, in order to have a large quantity of electricity, it is necessary to have the coefficient of $e^{31}$ in the above equation as large as possible. This means that z also should be as small as possible, at least with respect to $(y+4x)$.

As a practical matter, therefore, the materials considered to be most suitable for the practice of this invention are the saturated mono-alcohols having the general formula $C_nH_{2n+2}O$ and, in particular, the three alcohols methanol, ethanol, and propanol, which answer to the formula $C_nH_{2n+2}O$, with n being less than 4.

Comparing the formula of these alcohols to the general formula in the precharging equation given above, it can be seen that $x=n$, $y=2n+2$, and $z=1$. Substituting these values for the coefficient for $e^{31}$ in the equation yields $2n+2+4n-2=6n$ electrons produced from each molecule of alcohol. Since $n=x$ in the case of these materials, it is clear that each will produce, at least theoretically, the same quantity of carbonate ions for the same quantity of electricity. The only considerations which then affect a choice of material are considerations of solubility, ease of electrochemical oxidation, and cost. In this class of materials (i.e., having the general formula $C_nH_{2n+2}O$), the problem of solubility commences at $n=4$ (i.e., butanol). For this reason, the above-mentioned three alcohols are preferred as the material to be used in precharging the negative cadmium electrode of a nickel-cadmium cell according to the invention.

By this precharging method, cadmium is formed only after the cell has been closed; this has the advantage of avoiding precharge before assembly and the consequent discharge reaction of cadmium in contact with the oxygen in the air according to the following reaction:

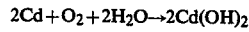

Further, the precharge rate can be accurately determined by choosing the quantity of additive in the electrolyte.

DETAILED DESCRIPTION OF THE PREFERRED EMBODIMENT

Other characteristics and advantages of the invention will become apparent from the following description, which is given only by way of illustration but having no limiting character.

As an example, methanol, which is anodically oxidized in an alkaline medium according to the following reaction:

$$CH_3OH + 8OH^- - 6e^- \rightarrow CO_3^{2-} + 6H_2O$$

was used in particular as the irreversibly anodically oxidizable material, the capacity required for this oxidation being 5Ah/g of methanol.

In the case where methanol is put in a nickel-cadmium storage cell, the overall charging reaction of the storage cell while the methanol is oxidized is therefore:

$$3Cd(OH)_2 + CH_3OH + 2OH^- \rightarrow CO_3^{2-} + 3Cd + 6H_2O$$

The metal cadmium thus formed represents the precharged cadmium.

After the methanol has been used up, the conventional charging reaction of the storage cell takes place normally.

Several series of sealed nickel-cadmium storage cells were assembled, each of which had a nominal capacity of 0.5 Ah. The different series of such cells are identified as follows:

Standard: cells whose negative electrodes have received no precharge.

Series 1: cells whose negative electrodes are electrochemically precharged with 100 mAh before the electrodes are assembled.

Series 2: As above, but the precharge is 200 mAh.

Series 3: As above, but the precharge is 300 mAh.

Series $M_1$: cells whose negative electrodes have received no precharge before assembly, but in which 20 mgr of methanol have been added to the electrolyte, corresponding to a precharge of 100 mAh.

Series $M_2$: cells like $M_1$, but in which 40 mgr of methanol have been added to the electrolyte, corresponding to a precharge of 200 mAh.

Series $M_3$: cells like $M_1$ but in which 60 mgr of methanol have been added to the electrolyte, corresponding to a precharge of 300 mAh.

These cells were subjected to cycles each consisting of a charge at 50 mA for 14 hours followed immediately by a discharge at 1A down to a terminal voltage of 0.9 V. The results obtained are set out in the following tables (see the tables at the end of the specification):

Table I illustrates the capacities of the various cells in the conditions defined hereinabove.

Table II shows the efficiency E of the precharge in percentage, this efficiency being defined by the difference between the capacity of the precharged cell and the capacity of the non-precharged cell divided by the precharge introduced thereto.

Table I shows that in general a precharge either by the electrochemical method or in accordance with the invention appreciably increases the cycling capacity. Indeed, from the 3rd cycle onwards, the standard storage cell has a capacity of only 322 mAh instead of the nominal capacity of 500 mAh. In contrast, the capacities of storage cells 1, 2 and 3 lie between 377 and 454 mAh and those of storage cells M1, M2 and M3 lie between 407 and 451 mAh. At the 138th cycle these capacities are respectively: 280 mAh for the standard storage cell, between 284 and 360 mAh for storage cells 1, 2 and 3, and between 314 and 410 mAh for storage cells M1, M2 and M3. It will be observed that the higher the precharge, the greater the remaining capacity. Such a result agrees, moreover, with the well-known fact that during slow charge-rapid discharge type cycles, an inconvenient increase of the cadmium grain size is observed, such grains losing their aptitude to discharge.

The precharged part therefore provides a reserve of dischargeable cadmium.

Table II shows that, first, the efficiency of the electrochemical precharge is generally less than that of the methanol precharge and that, secondly, although it has a tendency to decrease during cycling, the efficiency of the methanol precharge remains much more constant, at about 50%.

The use of methanol as a precharge agent has been described hereinabove. It will be appreciated that substitution of reduced molar quantities (by a factor equal to the reciprocal of x) of ethanol or propanol will yield comparable results because of the above-mentioned characteristic that each will produce the same quantity of carbonate ions and electricity per atom of carbon.

The method in accordance with the invention, therefore, makes it possible to impart to the negative electrode of an alkaline storage cell, in particular of the nickel-cadmium type, a precharge which is strictly predetermined, after crimping or closing said storage cell, thus avoiding the disadvantages due to electrochemical methods.

It is to be understood that the invention is in no way limited to the embodiments described hereinabove, but on the contrary, it covers all variants within the scope of the disclosure.

TABLE 1

Capacities (mAh) of cells whose discharge is stopped at 0.9V after a 14 hour charge at C/10, no rest, and discharge at 2C.

| Cycle No. | Standard S | Electrochemical precharge | | | Methanol precharge | | |
|---|---|---|---|---|---|---|---|
| | | 1 | 2 | 3 | M1 | M2 | M3 |
| 3 | 322 | 377 | 432 | 454 | 407 | 415 | 451 |
| 4 | 304 | 348 | 428 | 446 | 389 | 430 | 450 |
| 6 | 292 | 327 | 395 | 416 | 357 | 405 | 428 |
| 9 | 305 | 331 | 401 | 434 | 363 | 409 | 430 |
| 15 | 304 | 324 | 404 | 437 | 360 | 416 | 451 |
| 36 | 309 | 329 | 394 | 419 | 362 | 415 | 453 |
| 62 | 292 | 302 | 371 | 400 | 343 | 410 | 446 |
| 138 | 280 | 284 | 325 | 360 | 314 | 376 | 410 |

TABLE II

Efficiency of the precharge (%)
(Capacity of a non-precharged storage cell - capacity of a precharged storage cell)/ precharge introduced.

| Cycle No. | Electrochemical precharge | | | Methanol precharge | | |
|---|---|---|---|---|---|---|
| | 1 | 2 | 3 | M1 | M2 | M3 |
| 3 | 55 | 55 | 44 | 85 | 46 | 43 |
| 4 | 44 | 62 | 47 | 85 | 63 | 49 |
| 6 | 35 | 51 | 41 | 65 | 56 | 45 |
| 9 | 26 | 48 | 43 | 58 | 52 | 42 |
| 15 | 20 | 50 | 41 | 56 | 56 | 49 |
| 36 | 20 | 47 | 37 | 51 | 53 | 48 |
| 62 | 10 | 40 | 36 | 51 | 59 | 51 |
| 138 | 4 | 22 | 27 | 34 | 43 | 43 |

What is claimed is:

1. A method for precharging the negative electrode of a nickel-cadmium alkaline storage cell having electrodes assembled in an at least partially discharged state, comprising the steps of:
   introducing, before the first charge of the cell, a calculated quantity of a material into the cell, said material being irreversibly oxidizable in an alkaline medium at a potential such that it is anodically oxidized before nickel hydroxide without evolving any gas, and then
   charging the storage cell until said introduced material is completely oxidized.

2. A method according to claim 1, wherein said material consists of hydrogen, oxygen and carbon.

3. A method for precharging the negative electrode of a nickel-cadmium alkaline storage cell comprising the following steps:
   assembling the nickel and cadmium electrodes in the cell in an at least partially discharged state;
   introducing into the cell a predetermined quantity of a saturated mono-alcohol conforming to the formula $C_nH_{2n+2}O$, said mono-alcohol being irreversibly oxidizable in an alkaline medium at a potential such that it is anodically oxidized before nickel hydroxide without evolving any gas; and
   charging the cell until said predetermined quantity of a saturated mono-alcohol is completely oxidized.

4. A method according to claim 3 wherein the alcohol is selected from the group consisting of methanol, ethanol, and propanol.

5. A method according to claim 3 wherein said material is methanol.

6. A storage cell whose negative electrode has been precharged by the method according to claim 1.

7. A nickel-cadmium storage cell having a prechargeable negative electrode, the cell including a nickel positive electrode, a cadmium negative electrode, said electrodes being assembled in the cell in an at least partially discharged state, and an alkaline electrolyte, wherein the improvement comprises:
   a calculated quantity of a material added to the cell, said material being irreversibly oxidizable in an alkaline medium at a potential such that it is anodically oxidized before nickel hydroxide without evolving any gas, whereby subsequent charging of the cell will irreversibly completely oxidize said material to create a precharged negative cadmium electrode.

8. A storage cell according to claim 7 wherein said material consists of hydrogen, oxygen and carbon.

9. A storage cell according to claim 7 wherein said material consists of a saturated mono-alcohol conforming to the formula $C_nH_{2n+2}O$.

10. A storage cell according to claim 9 wherein said alcohol is selected from the group consisting of methanol, ethanol, and propanol.

* * * * *